United States Patent
Qiao et al.

(10) Patent No.: US 11,519,821 B2
(45) Date of Patent: *Dec. 6, 2022

(54) DETECTING FAULTS IN WIND TURBINES

(71) Applicant: NUtech Ventures, Lincoln, NE (US)

(72) Inventors: Wei Qiao, Lincoln, NE (US); Jun Wang, Lincoln, NE (US); Liyan Qu, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/107,505

(22) Filed: Nov. 30, 2020

(65) Prior Publication Data

US 2021/0108988 A1    Apr. 15, 2021

Related U.S. Application Data

(63) Continuation of application No. 15/985,226, filed on May 21, 2018, now Pat. No. 10,852,214.

(60) Provisional application No. 62/508,803, filed on May 19, 2017.

(51) Int. Cl.
*G01M 13/045*    (2019.01)
*F03D 17/00*    (2016.01)

(52) U.S. Cl.
CPC .......... *G01M 13/045* (2013.01); *F03D 17/00* (2016.05); *F05B 2240/50* (2013.01); *F05B 2260/80* (2013.01); *F05B 2270/327* (2013.01); *F05B 2270/334* (2013.01); *F05B 2270/335* (2013.01)

(58) Field of Classification Search
CPC .. F03D 17/00; F05B 2240/50; F05B 2260/80; F05B 2270/327; F05B 2270/334; F05B 2270/335; G01M 13/045

USPC .......................................................... 702/34
See application file for complete search history.

(56) References Cited

U.S. PATENT DOCUMENTS

| | | |
|---|---|---|
| 5,483,153 A | 1/1996 | Leeb |
| 7,040,859 B2 | 5/2006 | Kane |
| 7,268,443 B2 | 9/2007 | Kikuchi et al. |
| 7,888,810 B2 | 2/2011 | Moretto |

(Continued)

OTHER PUBLICATIONS

Akin et al., "Low order PWM inverter harmonics contributions to the inverter-fed induction machine fault diagnosis," IEEE Trans. Ind. Electron., 2008, vol. 55, No. 2, pp. 610-619.

(Continued)

*Primary Examiner* — John H Le
(74) *Attorney, Agent, or Firm* — Fish & Richardson P.C.

(57) ABSTRACT

A wind turbine generator fault detection method is described. The method includes obtaining a first signal from a generator of a wind turbine and a second signal from a vibration sensor coupled to the wind turbine, the first signal representing an output current of the generator, and the second signal being a time-sampled signal representing vibrations of a bearing in the wind turbine. Determining a shaft rotation frequency signal from the first signal, the shaft rotation frequency signal representing a time-varying rotational speed of a shaft of the wind turbine. Resampling an envelope of the second signal based on the shaft rotation frequency signal to provide a third signal, the third signal being an angular sampled signal. Detecting, by the at least one processor, a fault in the bearing of the wind turbine by identifying a characteristic signature of a bearing fault in the third signal.

20 Claims, 9 Drawing Sheets

(56) References Cited

U.S. PATENT DOCUMENTS

| | | | |
|---|---|---|---|
| 7,952,216 | B2 | 5/2011 | Kikuchi et al. |
| 8,067,845 | B2 | 11/2011 | Thulke et al. |
| 8,762,104 | B2 | 6/2014 | Hedin |
| 9,213,671 | B2 | 12/2015 | Hedin |
| 9,874,107 | B2 | 1/2018 | Falb |
| 10,133,257 | B2 | 11/2018 | Hedin |
| 10,359,473 | B2 | 7/2019 | Qiao et al. |
| 10,591,519 | B2 | 3/2020 | Qiao |
| 10,852,214 | B2 * | 12/2020 | Qiao ........................ F03D 17/00 |
| 2006/0066111 | A1 | 3/2006 | Suryanarayanan |
| 2007/0265843 | A1 | 11/2007 | Hetherington |
| 2008/0007247 | A1 | 1/2008 | Gervais |
| 2011/0098968 | A1 | 4/2011 | Srinivasa |
| 2011/0125419 | A1 | 5/2011 | Bechhoefer |
| 2012/0019723 | A1 | 1/2012 | McGrath |
| 2012/0299305 | A1 | 11/2012 | Brogan |
| 2013/0049733 | A1 | 2/2013 | Neti |
| 2013/0096848 | A1 | 4/2013 | Hatch |
| 2014/0003939 | A1 | 1/2014 | Adams |
| 2014/0152331 | A1 | 6/2014 | Wagoner |
| 2016/0033580 | A1 | 2/2016 | Qiao |
| 2016/0342148 | A1 | 11/2016 | Hedin |

OTHER PUBLICATIONS

Amirat et al., "Condition monitoring of wind turbines based on amplitude demodulation," in Proc. IEEE Energy Convers. Congr. Expo., 2010, pp. 2417-2421.
Blödt et al., "Models for bearing damage detection in induction motors using stator current monitoring," IEEE Trans. Ind. Electron., 2008, vol. 55, No. 4, pp. 1813-1822.
Bonnardot et al., "Use of the acceleration signal of a gearbox in order to perform angular resampling (with limited speed fluctuation)," Mech. Syst. Signal Process., Jul. 2005, 19: 766-785.
Borghesani et al., "A new procedure for using envelope analysis for rolling element bearing diagnostics invariable operating conditions," Mech. Syst. Signal Process., Jul. 2013, 38: 23-35.
Chapman, "Electric Machinery Fundamentals," 5th ed., New York: McGraw-Hill, Feb. 2011, 47-48.
Choqueuse et al., "Diagnosis of three-phase electrical machines using multidimensional demodulation techniques," IEEE Trans. Ind. Electron., 2012, vol. 59, No. 3, pp. 2014-2023.
Chow and Hai, "Induction machine fault diagnostic analy- sis with wavelet technique," IEEE Trans. Ind. Electron., Jun. 2004, 51: 558-565.
Combet and Gelman, "An automated methodology for performing time synchronous averaging of a gearbox signal without speed sensor," Mech. Syst. Signal Process., Aug. 2007, 21: 2590-2606.
Couch, "Digital & Analog Communication Systems," 7th ed. London: Prentice Hall, Jul. 2006, 282-290.
Djurovic et al., "Condition monitoring of wind turbine induction generators with rotor electrical asymmetiy," IET Renewable Power Generation, 2012, vol. 6, No. 4, pp. 207-216.
Ebrahimi et al., "Advanced eccentricity fault recognition in permanent magnet synchronous motors using stator current signature analysis," IEEE Trans. Ind. Electron., 2014, vol. 61, No. 4, pp. 2041-2052.
Ebrahimi et al., "Static, dynamic and mixed eccentricity fault diagnosis in permanent magnet synchronous motors," IEEE Trans. Ind. Electron., 2009, vol. 56, No. 11, pp. 4727-4739.
Emresoy and El-Jaroudi, "Iterative instantaneous frequency estimation and adaptive matched spectrogram," Signal Process., Jan. 1998, 64: 157-165.
Fadaeinedjad et al., "The impact of tower shadow, yaw error, and wind shears on power quality in a wind diesel system," IEEE Trans. Energy Convers., 2009, vol. 24, No. 1, pp. 102-111.
Feldman, "Hilbert Transform Application in Mechanical Vibration," 1st ed., New York: Wiley, Apr. 2011, pp. 14-20.
Feng and Liang, "Fault diagnosis of wind turbine planetary gearbox under nonstationary conditions via adaptive optimal kernel time-frequency analysis," Renewable Energy, Jun. 2014, 66: 468-477.
Feng et al., "Iterative generalized synchrosqueez- ing transform for fault diagnosis of wind turbine planetary gearbox un- der nonstationary conditions," Mech. Syst. Signal Process., Feb. 2015, 52-53: 360-375.
Freire et al., "Open-circuit fault diagnosis in PMSG drives for wind turbine applications," IEEE Trans. Ind. Electron., 2013, vol. 60, No. 9, pp. 3957-3967.
Frosini and Bassi, "Stator current and motor efficiency as indicators for different types of bearing faults in induction motors," IEEE Trans. Ind. Electron., Jan. 2010, 57: 244-251.
Fyfe and Munck, "Analysis of computed order tracking," Mech. Syst. Signal Process., Mar. 1997, 11: 187-205.
Garcia-Perez et al., "The application of high-resolution spectral analysis for identifying multiple combined faults in induction motors," IEEE Trans. Ind. Electron., vol. 58, No. 5, pp. 2002-2010, May 2011.
Gong et al., "Bearing fault detection for direct-drive wind turbines via stator current spectrum analysis," in Proc. Energy Conversion Congress and Exposition, 2011, pp. 313-318.
Gong et al., "Bearing fault diagnosis for direct-drive wind turbines via current-demodulated signals," IEEE Trans. Ind. Electron., 2013, vol. 60, No. 8, pp. 3419-3428.
Gong et al., "Current-based eccentricity detection for direct-drive wind turbines via synchronous sampling," in Proc. Energy Conversion Congress and Exposition, 2013, pp. 2972-2976.
Gong et al., "Current-based mechanical fault detection for direct-drive wind turbines via synchronous sampling and impulse detection," IEEE Trans. Industrial Electronics, 2015, 62(3):1693-1702.
Gong et al., "Current-based online bearing fault diagnosis for direct-drive wind turbines via spectmm analysis and impulse detection," in Proc. IEEE Symposium on Power Electronics and Machines in Wind Applications, Jul. 2012, pp. 1-6.
Gong, "Online nonintrusive condition monitoring and fault detection for wind turbines," Ph.D. Dissertation, University of Nebraska-Lincoln, Aug. 2012.
Gustafsson, "Determining the initial states in forward-backward filtering," IEEE Trans. Signal Processing, 1996, vol. 44, No. 4, pp. 988-992.
Hameed et al., "Condition monitoring and fault detection of wind turbines and related algorithms: A review," Renewable and Sustainable Energy Reviews, 2009, vol. 13, No. 1, pp. 1-39.
Hong et al., "Detection of airgap eccentricity for permanent magnet synchronous motors based on the d-axis inductance," IEEE Trans. Power Electron., 2012, vol. 27, No. 5, pp. 2605-2612.
Immovilli et al., "Currents and vibrations in asynchronous motor with externally induced vibration," in Proc. IEEE International Symposium on Diagnostics for Electric Machines, Power Electronics & Drives, 2011, pp. 580-584.
Immovilli et al., "Detection of generalized-roughness bearing fault by spectral-kurtosis energy of vibration or current signals," IEEE Trans. Ind. Electron., 2009, vol. 56, No. 11, pp. 4710-4717.
Immovilli et al., "Diagnosis of bearing faults in induction machines by vibration or current signals: A critical comparison," IEEE Trans. Ind. Appl., 2010, vol. 46, No. 4, pp. 1350-1359.
Jin et al., "Motor bearing fault diagnosis using trace ratio linear discriminant analysis," IEEE Trans. Ind. Electron., May 2014, 61: 2441-2451.
Kar et al., "Monitoring gear vibrations through motor current signature analysis and wavelet transform," Mechanical Systems and Signal Processing, 2006, vol. 20, No. 1, pp. 158-187.
Kia et al., "A modeling approach for gearbox monitoring using stator current signature in induction machines," in Proc. IEEE Industry Applications Society Annual Meeting, Oct. 2008, pp. 1-6.
Kia et al., "Analytical and experimental study of gearbox mechanical effect on the induction machine stator current signature," IEEE Trans. Industry Applications, 2009, vol. 45, No. 4, pp. 1405-1415.
Kia et al., "Gearbox monitoring using induction machine stator current analysis," in Proc. IEEE International Symposium on Diagnostics for Electric Machines, Power Electronics and Drives, 2007, pp. 149-154.

(56) References Cited

OTHER PUBLICATIONS

Kwok and Jones, "Improved instantaneous frequency estimation using an adaptive short-time Fourier transform," IEEE Trans. Signal Process., Oct. 2000, 48: 2964-2972.
Lacey, "An overview of bearing vibration analysis," Maintenance Asset Manage., Nov./Dec. 2008, 23: 32-42.
Link, et al., "Gearbox reliability collaborative project report: findings from phase 1 and phase 2 testing," National Revewable Energy Laboratory, Golden, CO, Tech. Rep. NREL/TP-5000-51885, Jun. 2011.
Lu et al., "A review of recent advances in wind turbine condition monitoring and fault diagnosis," in Proc. IEEE Symposium on Power Electronics and Machines in Wind Applications, 2009, pp. 1-7.
Luo and Liang, "Application of multi-scale chirplet path pursuit and fractional Fourier transform for gear fault detection in speed up and speed-down processes," J. Sound Vib., Oct. 2012, 331: 4971-4986.
Luo et al., "Synthesized synchronous sampling technique for differential bearing damage detection," Journal of Engineering for Gas Turbines and Power, 2010, vol. 132, No. 7.
Musial et al., "Large-scale offshore wind power in the United States: Assessment of opportunities and barriers," Technical Report, National Renewable Energy Laboratory, Sep. 2010, [Online].
Oppenheim et al., "Discrete-Time Signal Processing," 3rd ed. Prentice Hall, 2009, 714-722, 775-789.
Pitas et al., "Nonlinear Digital Filters: Principles and Applications", Kluwer Academic Publishers, 1990, 63-65.
Qiao and Lu, "A survey on wind turbine condition monitoring and fault diagnosis—Part I: Components and subsystems," IEEE Trans. Ind. Electron., Oct. 2015, 62: 6536-6545.
Rajagopalan et al., "Dynamic eccentricity and demagnetized rotor magnet detection in trapezoidal flux (brushless DC) motors operating under different load conditions," IEEE Trans. Power Electron., 2007, vol. 22, No. 5, pp. 2061-2069.
Randall and Antoni, "Rolling element bearing diagnostics—A tutorial," Mech. Syst. Signal Process., 2011, 25: 485-520, 2011.
Ribrant, "Reliability performance and maintenance—a survey of failures in wind power system," M. S. Thesis, KTH School of Electrical Engineering, Stockholm, Sweden, 2006.
Saleh et al., "Wavelet-based signal processing method for detecting ice accretion on wind turbines," IEEE Trans. Sustainable Energy, 2012, vol. 3, No. 3, pp. 585-597.
Saramov et al., "Nonuniform synchronous sampling analog interface," in Proc. 29th Int. Spring Seminar on Electronics Technology, 2006, pp. 329-333.
Schulte et al., "A fuzzy impulse noise detection and reduction method," IEEE Trans. Image Processing, 2006, vol. 15, No. 5, pp. 1153-1162.
Sheng, "Wind turbine gearbox condition monitoring round robin study—Vibration analysis," National Renewable Energy Laboratory, Golden, CO, Tech. Rep. NREL/TP-5000-54530, Jul. 2012.
Simani et al., "Fault diagnosis of a wind tur- bine benchmark via identified fuzzy models," IEEE Trans. Ind. Electron., Jun. 2015, 62: 3775-3782.
Tavner et al., "Reliability analysis for wind turbines," Wind Energy, 2007, vol. 10, pp. 1-18.
Teotrakool et al., "Adjustable-speed drive bearing-fault detection via wavelet packet decomposition," IEEE Trans. Instrumentation and Measurement, 2009, vol. 58, No. 8, pp. 2747-2754.
Umehara et al., "Statistical impulse detection of in-vehicle power line noise using hidden Markov model," in Proc. IEEE Int. Symposium on Power Line Communications and its Applications, 2010, pp. 341-346.
Verbruggen, "Wind turbine operation & maintenance based on condition monitoring," Final Report, Energy Research Center of the Netherlands, Apr. 2003, [Online]. Available: www.ecn.nl/docs/library/report/2003/c03047.pdf.
Villa et al., "Angular resampling for vibration analysis in wind turbines under non-linear speed fluctuation," Mech. Syst. Signal Process., Aug. 2011, 25: 2157-2168.
Wang et al., "A new synthetic detection technique for trackside acoustic identification of railroad roller bearing defects," Appl. Acoust., Nov. 2014, 85: 69-81.
Wang et al., "Rolling element bearing fault diagnosis via fault characteristic order (FCO) analysis," Mech. Syst. Signal Process., Mar. 2014, 45: 139-153.
Wang et al., "Rotating speed isolation and its application to rolling element bearing fault diagnosis under large speed variation conditions," J. Sound Vib., Jul. 2015, 348: 381-396.
Watson et al., "Condition monitoring of the power output of wind turbine generators using wavelets," IEEE Trans. Energy Convers., 2010, vol. 25, No. 3, pp. 715-721.
Xie et al., "An advanced PLS approach for key performance indicator related prediction and diagnosis in case of outliers," IEEE Trans. Ind. Electron., Apr. 2016, 63: 2587-2594.
Yacamini et al., "Monitoring torsional vibrations of electromechanical systems using stator currents," Journal of Vibration and Acoustics, 1998, vol. 120, No. 1, pp. 72-79.
Yang et al., "Cost-effective condition monitoring for wind turbines," IEEE Trans. Ind. Electron., 2010, vol. 57, No. 1, pp. 263-271.
Yin et al., "Data-driven process monitoring based on modified orthogonal projections to latent structures," IEEE Trans. Control Syst. Technol, Jul. 2016, 24: 1480-1487.
Yin et al., "Real-time implementation of fault- tolerant control systems with performance optimization," IEEE Trans. Ind. Electron., May 2014, 61: 2402-2411.
Zhao et al., "Tacholess envelope order analysis and its application to fault detection of rolling element bearings with varying speeds," Sensors, Aug. 2013, 13: 10856-10875.
Zhao et al., "A review on position/speed sen- sorless control for permanent magnet synchronous machine-based wind energy conversion systems," IEEE J. Emerg. Sel. Topics Power Electron., Dec. 2013, 1: 203-216.
Zhao et al., "A tacho-less order tracking technique for large speed variations," Mech. Syst. Signal Process., Oct. 2013, 40: 76-90.
Zhou et al., "Bearing fault detection via stator current noise cancellation and statistical control," IEEE Trans. Ind. Electron., Dec. 2008, 55: 4260-4269.

* cited by examiner

DETECTING FAULTS IN WIND TURBINES

CLAIM OF PRIORITY

This application is a continuation and claims priority to U.S. application Ser. No. 15/985,226, filed on May 21, 2018, which claims priority to U.S. Provisional Application Ser. No. 62/508,803, filed on May 19, 2017, the entire contents of which are hereby incorporated by reference.

FEDERALLY SPONSORED RESEARCH OR DEVELOPMENT

This invention was made with government support under DE-EE0006802 awarded by the Department of Energy and ECCS1308045 awarded by the National Science Foundation. The government has certain rights in the invention.

TECHNICAL FIELD

This disclosure relates to detecting faults produced by wind turbine generators.

BACKGROUND

Wind turbines generate electricity using a clean and renewable resource that can be used to provide sustainable electricity to the world. The reliability of such wind turbines can be a direct correlation to proper installation and maintenance of the turbines. This reliability can be improved by using various condition monitoring technologies to ensure proper functionality of the wind turbines. For example, detecting broken blades before the entire wind turbine malfunctions can ensure that damage to other wind turbine components can be minimized.

Detecting faults in wind turbines before damage occurs to other components can increase the lifespan and/or energy output capabilities of the turbine. Conventional fault detection techniques typically include using sensors and data acquisition devices that can monitor the operation of the wind turbines or components in the wind turbines. These sensors can be mounted on the surface or buried in the body of wind turbine components. During typical use, the sensors and turbines can be subject to failure due to poor working conditions, which could cause additional problems with system reliability and additional operating and maintenance costs. Early detection of possible failures can ensure that such failures occur less often.

SUMMARY

Methods and systems are described for detecting wind turbine generator faults by using generator current measurements to overcome problems associated with vibration analysis of wind turbines. In an example implementation, the disclosure presents a current-aided vibration order tracking process for bearing fault diagnosis of variable-speed wind turbines. The process includes acquiring a reference signal from a current signal measured at the stator of a generator for vibration order tracking. A fundamental frequency of the current signal is estimated in the time-frequency domain to obtain the shaft rotating frequency. Then, the shaft phase-time relationship is established. With this information, the envelope of the synchronously recorded vibration signal is subsequently resampled at equal-phase-increment time points. A bearing fault diagnosis is performed by observing the peaks at bearing characteristic frequencies in the power spectrum of the resampled vibration envelope signal.

In general, innovative aspects of the subject matter described in this specification can be embodied in methods that include the actions of obtaining a first signal from a generator of a wind turbine and a second signal from a vibration sensor coupled to the wind turbine, where the first signal represents an output current of the generator, and the second signal is a time-sampled signal representing vibrations of a bearing in the wind turbine. Determining a shaft rotation frequency signal from the first signal, where the shaft rotation frequency signal representing a time-varying rotational speed of a shaft of the wind turbine. Resampling an envelope of the second signal based on the shaft rotation frequency signal to provide a third signal, where the third signal is an angular sampled signal. Detecting a fault in the bearing of the wind turbine by identifying a characteristic signature of a bearing fault in the third signal. Other implementations of this aspect include corresponding systems, apparatus, and computer programs, configured to perform the actions of the methods, encoded on computer storage devices. These and other implementations can each optionally include one or more of the following features.

In some implementations, determining the shaft rotation frequency signal from the first signal includes estimating, at each of multiple different time steps, a fundamental frequency of the first signal, and determining the shaft rotation frequency signal based on the fundamental frequency of the first signal at each time step. In some implementations, estimating the fundamental frequency of the first signal at each time step includes determining, at each time step, a maximum value of a time-frequency distribution of the first signal. In some implementations, determining the shaft rotation frequency signal includes calculating the shaft rotation frequency signal from the fundamental frequency of the first signal based on a number of poles of the generator of the wind turbine.

Some implementations include determining the envelope of the second signal using a Hilbert transform of the second signal. Some implementations include oversampling the envelope of the second signal using an oversampling frequency that is greater than a sampling frequency of the second signal. In some implementations, the envelope of the second signal is oversampled by an oversampling frequency that is greater than a sampling frequency of the second signal. Some implementations include providing, for display to a user, data indicating the fault in the bearing of the wind turbine.

In some implementations, resampling the envelope of the second signal includes determining, based on the shaft rotation frequency signal, a phase-time relationship between time steps of the shaft rotation frequency signal and phases of the shaft of the wind turbine, and generating a resampling vector of time points representing constant phase increments of the shaft of the wind turbine in an angular domain based on the phase-time relationship. In some implementations, resampling the envelope of the second signal includes resampling the envelope of the second signal based on the resampling vector to provide the third signal representing vibrations of the bearing as being sampled at constant phase increments of the shaft of the wind turbine in the angular domain.

In some implementations, detecting a fault in the bearing of the wind turbine includes generating an order-domain representation of the third signal, and identifying the characteristic signature of the bearing fault in the order-domain representation of the third signal. In some implementations, generating the order-domain representation of the third signal comprises performing a fast Fourier transform on the third signal. In some implementations, generating the order-domain representation of the third signal comprises converting the order-domain representation of the third signal into frequency-domain based on a selected reference shaft rotation frequency. In some implementations, the operations further comprise 168 identifying a type of the fault based on the characteristic signature. In some implementations, the type of the fault comprises one of an inner race fault, an outer race fault, a cage fault relative to an outer bearing ring; and a cage fault relative to an inner bearing ring.

Particular implementations of the subject matter described in this specification can be implemented so as to realize one or more of the following advantages. Implementations of the described systems and techniques may provide for one or more advantages. For example, implementations may provide a computationally efficient, highly sensitive technique for using current measurements in online fault detection for a wind turbine generator while the generator is operating in non-stationary conditions. Some implementations may provide accurate detection of bearing faults without the need to add invasive hardware into a turbine. Some implementations provide improved accuracy for bearing fault detection. Some implementations provide improved accuracy for detecting bearing faults using vibration measurements by using measurements of generator output current to account for shaft speed fluctuation.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
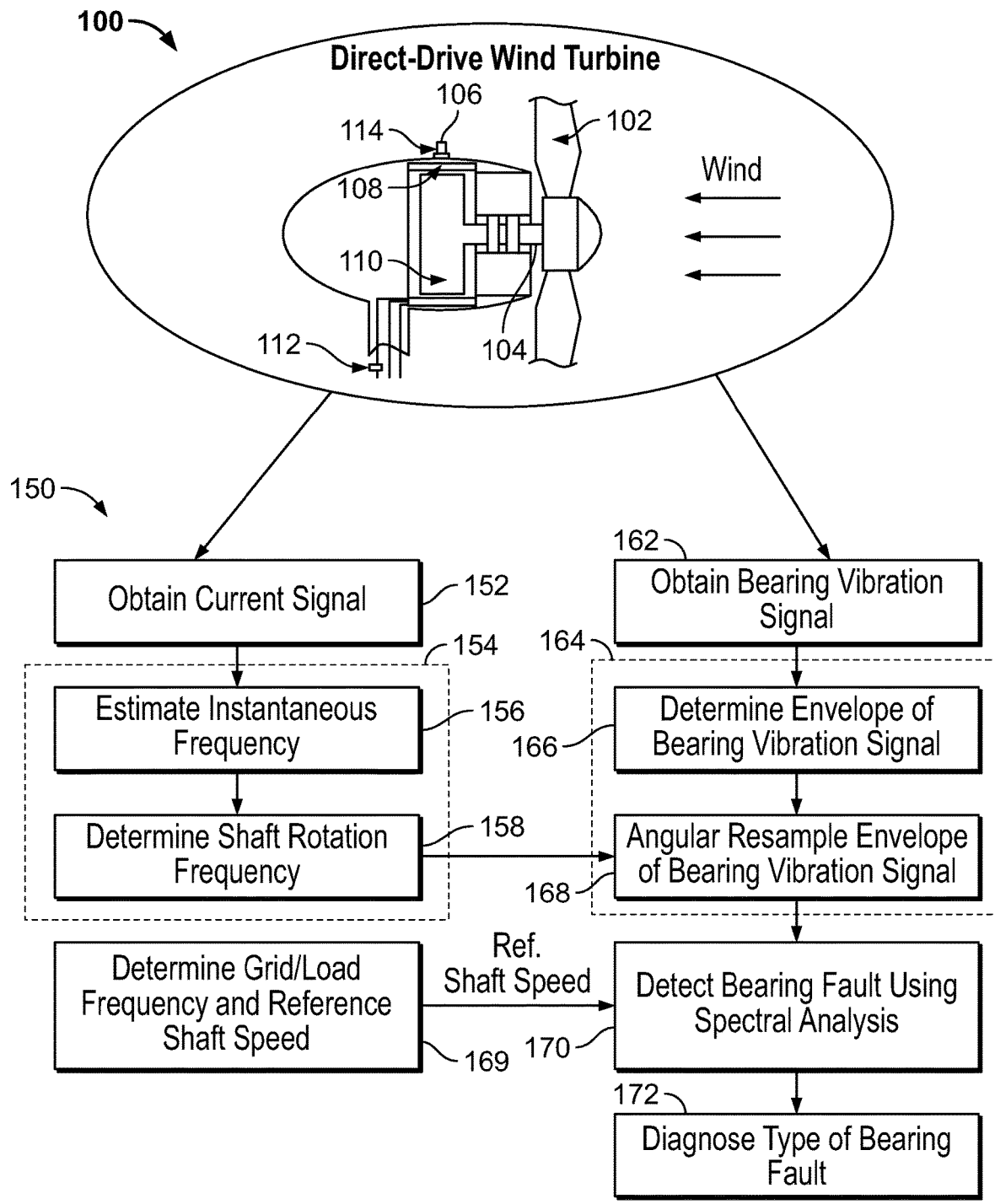
FIG. 1 shows a block diagram of an example wind turbine and a flowchart of an exemplary current-aided bearing fault detection process.

Wind power generation systems may be implemented to provide power to users connected to the power grid. These systems can be prone to faults or failures over time based on a number of environmental factors as well as component failure or wear in wind turbines or other mechanisms associated with the wind power generation system. Turbines are usually located in remote areas and operated in harsh conditions caused by volatile wind speed and direction, varying load, humidity, storm, snow, etc. Thus, it is highly desirable to perform online condition monitoring for wind turbines to improve their availability, safety, and reliability, reduce the operation and maintenance costs, and achieve downtime minimization and productivity maximization. Bearing is one of the most important mechanical components in wind turbines. It is widely used in the rotor, main shaft, generator, gearbox, yaw, pitch, and other rotating parts of wind turbines. Since many mechanical damages in wind turbine start from bearing faults, it is advantageous to diagnose the bearing faults as early as possible to prevent severe or catastrophic wind turbine damages and the consequent costly maintenance and downtime.

Unlike the data-driven process monitoring methods, which construct the process models according to the historical data, some methods of bearing fault diagnosis extract the fault features from the data currently acquired from appropriate sensors. Vibration monitoring has been widely recognized as one of the most popular, effective, and reliable methods for bearing condition monitoring and fault diagnosis. In the vibration monitoring, signals are measured by vibration sensors (e.g., accelerometers) attached to the casings of bearings with a constant sampling time interval, and are further analyzed using appropriate signal processing techniques to extract the bearing fault information. However, some methods are effective only when the shaft rotating speed is constant. Due to the variation of bearing rotating speed caused by volatile wind conditions, the vibration signals have a spectrum smearing problem that makes it difficult to identify potential bearing fault characteristic frequencies. There have been great interests in dealing with this kind of varying-rotating-speed-caused nonstationary signals. For example, some techniques aiming at improving the signal time-frequency resolution have been explored to distinguish the time-variant characteristic frequencies in the time-frequency domain. However, these methods are usually laborious and time-consuming, and require high computational resources.

The process described herein using current-aided order tracking techniques are effective at solving the spectrum smearing problem caused by speed variation so that the conventional spectrum analysis methods can be employed for fault detection. For example, Implementations described herein employ a vibration order tracking method with the aid of a generator stator current signal for bearing fault diagnosis of variable-speed direct-drive wind turbines. In the proposed method, the current signal is not used for fault signature extraction for bearing fault diagnosis of induction motors or direct-drive wind turbines, but as a resource to provide the information of the shaft speed for the order tracking of the vibration signal. The fundamental frequency is dominant in the current signal and is a fixed multiplier of the varying shaft speed, which facilitates the extraction of the reference signal for the order tracking. Moreover, generator current signals are measured and used by wind turbine control systems so the addition of sensor or data acquisition hardware is, generally, not required. Therefore, the proposed methods may be less invasive and can be used for wind turbines without speed sensors.

In general, the systems and techniques described in this document can monitor wind turbine conditions and detect wind turbine faults using efficient and highly sensitive signal processing methods performed when the wind turbines are operating in non-stationary conditions. Further analysis can be performed on data collected from any or all of the monitoring described above and such analysis can be used to preemptively discover failures occurring in one or more components of the wind power generation system.

Implementing fault detection mechanisms for wind turbines and/or the generators that operate the turbines can include the use of direct measurements, sensor output, and/or analysis of both. The direct measurements can include measurement of signals, inputs, or outputs produced by the turbine components. One example direct measurement can include measuring the current from the generator for a particular wind turbine. Current-based fault detection methods typically measure current used by a control system that operates a wind turbine or current in the generator itself. These current measurements are generally reliable and easily accessible from the ground level without intruding upon the wind turbine generators that are situated on high towers and/or installed in remote areas. The measured current can be analyzed through the use of signal processing techniques to determine whether or not a fault or failure is present in the wind turbine.

Various signal processing techniques can be used to detect bearing faults with characteristic frequencies (e.g., inner and outer race faults) in wind turbine generators. Example techniques can include classical frequency spectrum analysis, bicoherence analysis, time-frequency analysis, amplitude demodulation, and data mining. In certain implementations, classical frequency spectrum analysis and bicoherence analysis can identify imbalance faults based on known characteristic frequencies.

In various implementations of the systems described herein, sensors can also be used to monitor conditions, trigger other sensors, or alert personnel that a fault or failure has been detected. Example sensors can include, but are not limited to, temperature sensors, vibration sensors, or both. Such sensors are selected depending on a number of factors associated with the wind power generation system and the types of faults that can occur. For example, factors for sensor selection can include, but are not limited to, particular accuracy requirements, range/resolution requirements, environmental conditions that the sensor will incur, and cost. Example sensors can include accelerometers, temperature sensors, pressure/flow sensors, level sensors, proximity sensors, biosensors, image sensors, chemical sensors, and/or mechanical sensors including MEMS (microelectromechanical sensors).

Current-Aided Vibration Order Tracking

In the order tracking approach, a varying-rotating-speed non-stationary signal in the time domain is converted into a constant-rotating-speed quasistationary signal in the angle domain by resampling the signal with an equal phase increment of a selected shaft. In a current signal measured from the stator of a permanent-magnet synchronous generator (PMSG), the fundamental frequency component is dominant and its frequency is proportional to the varying shaft rotating speed. Therefore, if the instantaneous fundamental frequency is estimated from the current signal, the shaft rotating frequency can be obtained. With this reference signal, angular resampling can be performed for the vibration signal at the times when the shaft rotation at equal phase increments. In some implementations of the present disclosure, the resampling is performed on the envelope of a bearing vibration signal rather than the original signal. This is because the invariable structural resonance frequency in the original vibration signal will be variable in the resampled vibration signal. This can introduce a new spectrum smearing area around the resonance frequency, which is an obstacle for the subsequent demodulation of the fault characteristic frequency from the resonance band. On the contrary, there is no smearing problem on the fault information in the spectrum of the resampled vibration envelope signal. Thus, a bearing fault characteristic frequency can be revealed directly.

FIG. 1 shows a block diagram of an example wind turbine 100 and a flowchart of an exemplary current-aided bearing fault detection process 150. The wind turbine 100 includes a blade 102 coupled to one end of a shaft 104. The other end of the shaft 104 is coupled to a rotor 110 of an electric generator (e.g., a permanent-magnet synchronous generator). Relative motion between the rotor 110 (e.g., which includes a permanent magnet) and stator 108 of the generator produces electrical current at the stator 110, e.g., the stator current. The shaft is supported by, and rides on, bearings 106. The bearings 106 can be, for example, roller bearings, journal bearings, or any other type of bearings. However, for clarity, the bearing fault detection process 150 is described in reference to roller bearings.

The bearing fault detection process 150 can be executed to detect faults in the bearings 106 of a wind turbine 100. The process 150 can be implemented, for example, by one or more computing systems. For example, the process 150, or portions thereof, can be provided by one or more programs executed by one or more computing systems. In some implementations, the process 150 can be executed by one or more signal processors. For example, the process 150 can be implemented by one or more application-specific integrated circuits (ASICs) or one or more field programmable logic arrays (FPGAs).

Briefly, the bearing fault detection process 150 includes obtaining a current signal (152) from a generator. For example, the current signal can be obtained from current sensor 112 that is operatively coupled to an output wire of the generator's stator 108. In some examples, the current signal can be referred to as a stator current. A reference signal is determined from the stator current (154). For example, a reference signal that will be used to resample a vibration signal from the wind turbine can be determined from the stator current. As discussed in more detail below, the reference signal can be determined by estimating an instantaneous fundamental frequency of the stator current (156). For example, the fundamental frequency of the stator current can be estimated at each of multiple different time steps. The shaft rotating frequency can be determined based on the estimated frequency of the stator current (158).

The reference signal that is determined from the stator current can be used to resample a bearing vibration signal at equal phase increments, for example, to normalize the frequency of vibrations that are shaft-speed dependent (e.g., vibrations caused by bearing faults). For example, the reference signal obtained from the stator current can be used to resample a non-stationary vibration signal sampled in the time domain so as to convert the vibration signal into a constant-rotating-speed quasistationary signal in the angle domain. To do so, a bearing vibration signal is obtained (162). For example, a bearing vibration signal can be obtained from a vibration sensor 114 on a wind turbine 100. The vibration signal can be a time-sampled signal representing vibrations of a bearing 108 in the wind turbine 100. The vibration signal is resampled based on the reference signal obtained from the stator current (164). For example, an envelope of the bearing vibration signal can be determined (166) and the envelope of the bearing vibration signal can be angularly resampled based on the reference signal (168). Bearing faults can be detected by a spectral analysis of the resampled bearing vibration signal (170). For example, the frequency spectrum of the resampled bearing single can be analyzed to identify frequency components that are characteristic of a bearing fault.

In some implementations, particular types of bearing faults (e.g., inner race fault, outer race fault, cage faults, or a combination thereof) can be diagnosed by identifying a characteristic frequency(ies) of the particular type of fault (172). In some implementations, a grid or load frequency (e.g., of an electrical grid/load coupled to the generator) is used to determine a reference shaft speed of the turbine (169). For example, the reference shaft speed can be used to estimate the expected characteristic frequencies of one or more types of bearing faults, e.g., for comparison to the spectrum of the resampled vibration signal. In some implementation, if a bearing fault is detected, data indicating the fault can be provided for display to a user. For example, data indicating the fault occurred and the type of fault can be provided for display to a user (e.g., at a central operation station for a wind farm). In some implementations, a wind turbine generator 100 can be shutdown in response to detecting a fault. For example, the wind turbine generator 100 can be shutdown to prevent further damage to the bearing 108, the shaft 104, the generator (e.g., rotor 110 or stator 108), or other components of the wind turbine generator 100.

The above steps of process 150 are described in more detail below.

Reference Signal Determination (154)

The reference signal can be determined from a measured time-series signal can be accomplished by instantaneous frequency estimation (IFE) of the shaft rotating speed-related component (156). For example, IFE methods that can be used to estimate shaft-rotating speed include, but are not limited to, phase-based and time-frequency distribution (TFD)-based methods. The phase-based method estimates the target instantaneous frequency (IF) fi (t) as follows:

$$f_i(t) = \frac{1}{2\pi} \cdot \left(\frac{d[\phi(t)]}{dt}\right) \quad \text{(Eq. 1)}$$

where φ(t) is the instantaneous phase of an analytic signal. For a given time series x(t), the corresponding analytic signal y(t) is expressed as $$y(t) = x(t) + j\hat{x}(t) \quad \text{(Eq. 2)}$$

where x̂(t) is the Hilbert transform of x(t), i.e., $$\hat{x}(t) = H\{x(t)\} = \frac{1}{\pi}\int_{-\infty}^{+\infty}\frac{x(\tau)}{t-\tau}d\tau \quad \text{(Eq. 3)}$$

The instantaneous phase φ(t) is hence calculated by $$\varphi(t) = \arctan\left\{\frac{\hat{x}(t)}{x(t)}\right\} \quad \text{(Eq. 4)}$$

It should be noted that the definition of the IF in (Eq. 1) may be effective for only a single-frequency signal. For example, if the original signal contains multiple frequency components, the target frequency component should be first separated from the original signal. Nonetheless, the performance of the phase-based method can be susceptible to some in-band noise.

In some implementations, the TFD-based IFE method can produce more reliable and more robust-to-noise results. The TFD of a signal gives a two-dimensional representation of both the time and frequency information of the signal and, therefore, is effective for the analysis of a nonstationary signal. The variation of the frequency components contained in the signal can be readily visualized on the time-frequency plane. The short-time Fourier transform (SIFT) is a simple and easy-to-use tool to construct the TFD.

Mathematically, the STFT of a signal x(t) is defined as $$STFT(t,f) = \int_{-\infty}^{+\infty} x(\tau)h(\tau-t)e^{-j2\pi f\tau}d\tau di \quad \text{(Eq. 5)}$$

where h(t) is a short-time analysis window function centered around zero, and $\_h2\_=1$. The STFT of x(t) is essentially the Fourier transform of x(τ)h(τ−t), presenting a series "local spectra" of the signal x(τ) around the analysis time point τ=t. The magnitude of the STFT yields the TFD of the signal $$TFD(t,f) = |STFT(t,f)| \quad \text{(Eq. 6)}$$

The length of h(t) should be large enough to obtain a high-frequency resolution of the TFD in order to capture a target frequency component that varies continuously. Then, the IF in the time-frequency domain can be interpreted as the weighted average of the frequencies in the signal at each time point as follows $$f_i(t) = \frac{\int_{-\infty}^{+\infty} fTFD(t,f)df}{\int_{-\infty}^{+\infty} TFD(t,f)df} \quad \text{(Eq. 7)}$$

where the analyzed signal is also supposed to contain only one frequency component. Another example for the TFD-based IFE is to find out the local peaks along the time axis of the TFD of the signal. Then, the frequency associated with the local maximum of the time-frequency amplitude is the IF in a narrow frequency band at each time point. This makes it possible to extract one of the IFs from a multi-component signal. However, if some adjacent components of the signal overlap due to a large speed variation, it will be difficult to perform the IFE for an overlapping component. On the contrary, for an ideal monocomponent signal, the IFE can be easily achieved by the following direct maximum method, which searches for the global maxima over the whole frequency range of the TFD of the signal along the time axis.

$$f_i(t) = \mathrm{argmax}_f\{TFD(t,f)\} \quad \text{(Eq. 8)}$$

Figure 2A:
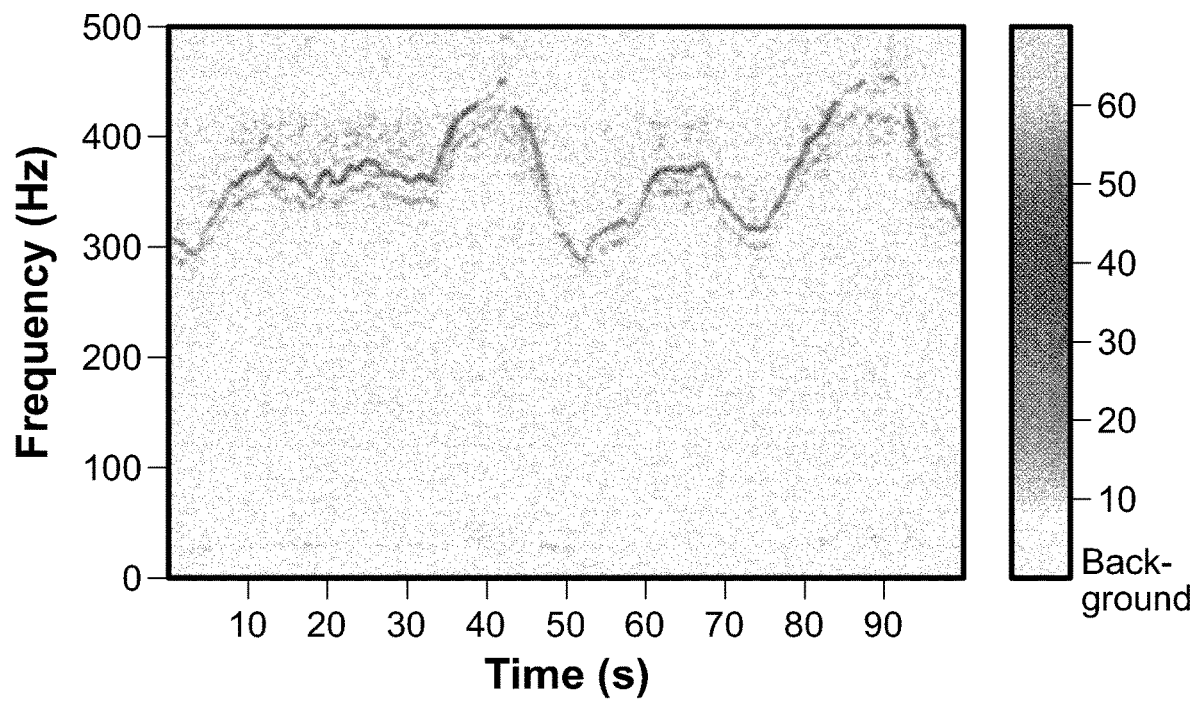
FIGS. 2A and 2B depict graphs of time-frequency distributions (TFD) of a bearing vibration signal (FIG. 2A) and a wind turbine generator current signal (FIG. 2B).
Figure 2B:
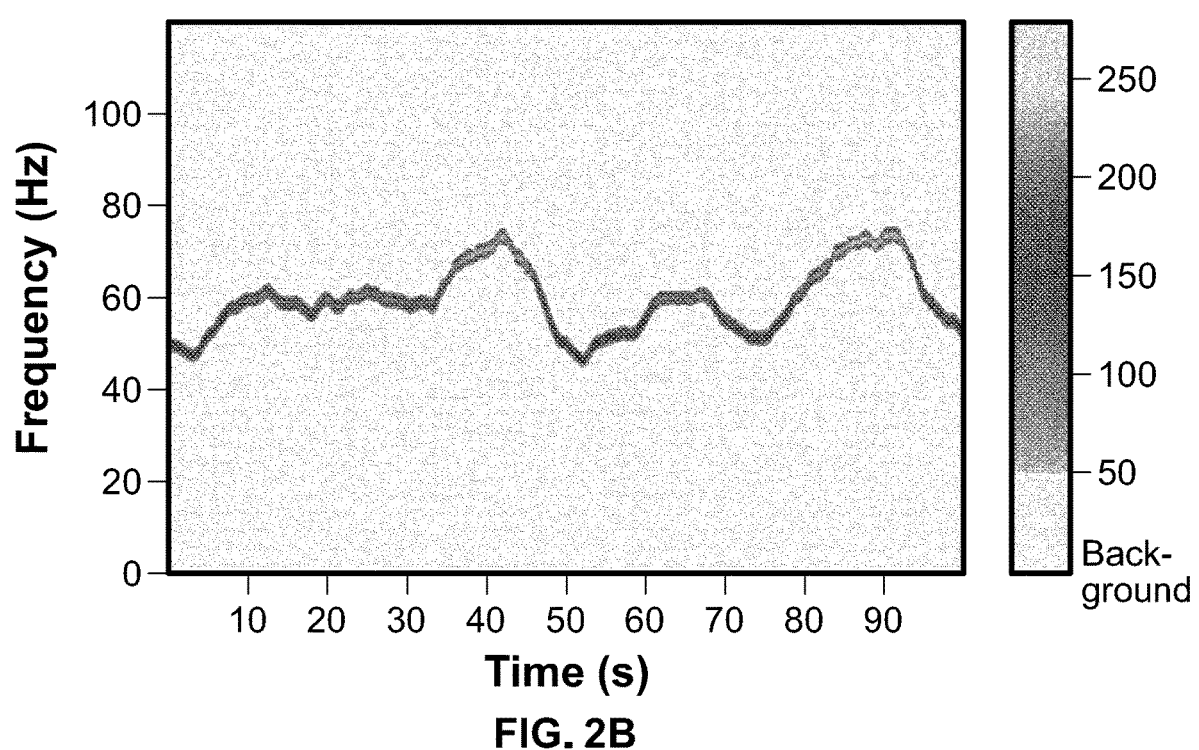

FIGS. 2A and 2B show the TFDs of a bearing vibration signal and a generator current signal measured synchronously from a direct-drive wind turbine with a bearing out-race fault, which will be further analyzed below by, for example, steps 170, 172 of process 150. The length of the analysis window in the depicted example is 8001 points for both the vibration and current signals. As shown in FIG. 2A, several frequency components vary with the rotating speed on the TFD of the vibration signal. One component in the high-frequency area has the highest energy and is prominent on the time-frequency plane. However, the ratio between the frequency of that component and the shaft rotating frequency is not a priori knowledge. The low-frequency area mainly contains the rotating frequency and its harmonics. However, their amplitudes are much smaller than those of the frequency components in the high-frequency area. Consequently, it is difficult to determine which one is the fundamental rotating frequency without a priori knowledge. Moreover, the problem of overlap between adjacent components appears in the areas when the shaft speed varies rapidly. In a word, it is difficult to extract a reference signal from the bearing vibration signal.

The current signal has advantages over the vibration signal for the reference signal extraction. As illustrated in FIG. 2B, there is only one component lying on the current TFD with large energy concentrated. That component is the fundamental frequency component of the current signal. Therefore, the IFE can be performed automatically without the need of selecting a target frequency via visual observation. The relationship between the current fundamental frequency fb (t) and the shaft rotating frequency fr (t) is $$f_b(t) = p \cdot f_r(t) \quad \text{(Eq. 9)}$$

where p is the number of pole pairs of the generator.

Figure 3A:
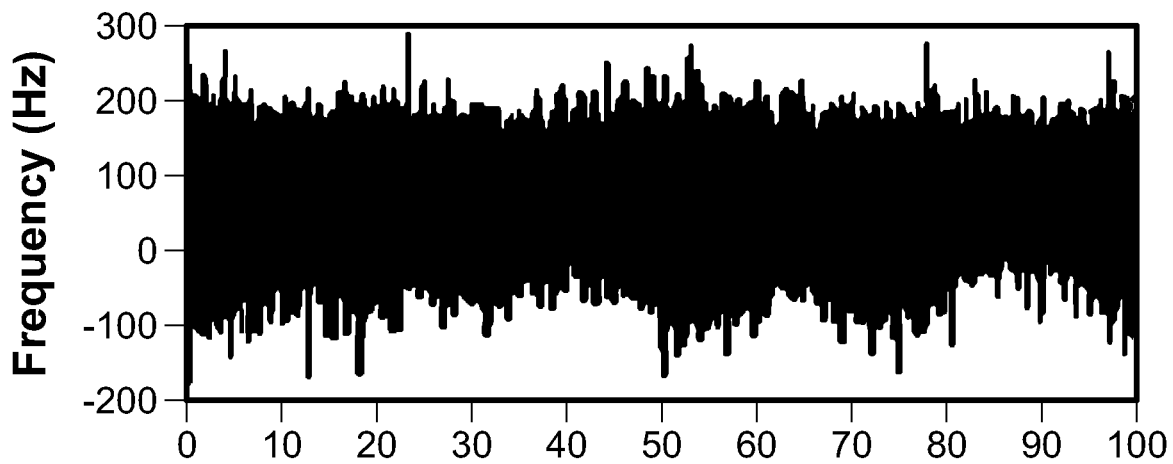
FIGS. 3A-3C depict graphs various methods of instantaneous fundamental frequency estimation (IFE) for the fundamental frequency of a current signal by (FIG. 3A) the phase-based method, (FIG. 3B) the phase-based method followed by a local average algorithm, and (FIG. 3C) the TFD-based method.
Figure 3B:
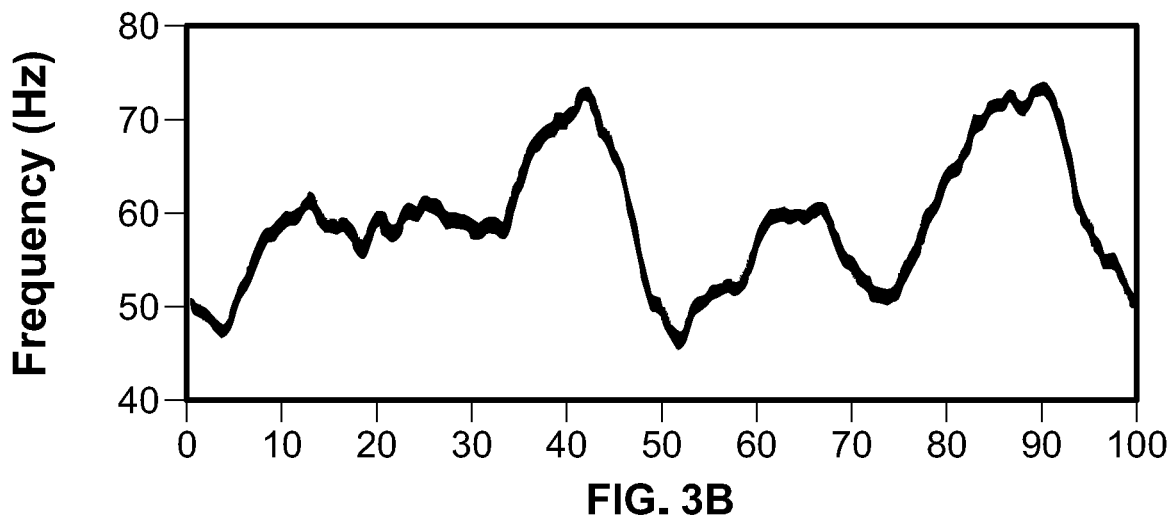
Figure 3C:
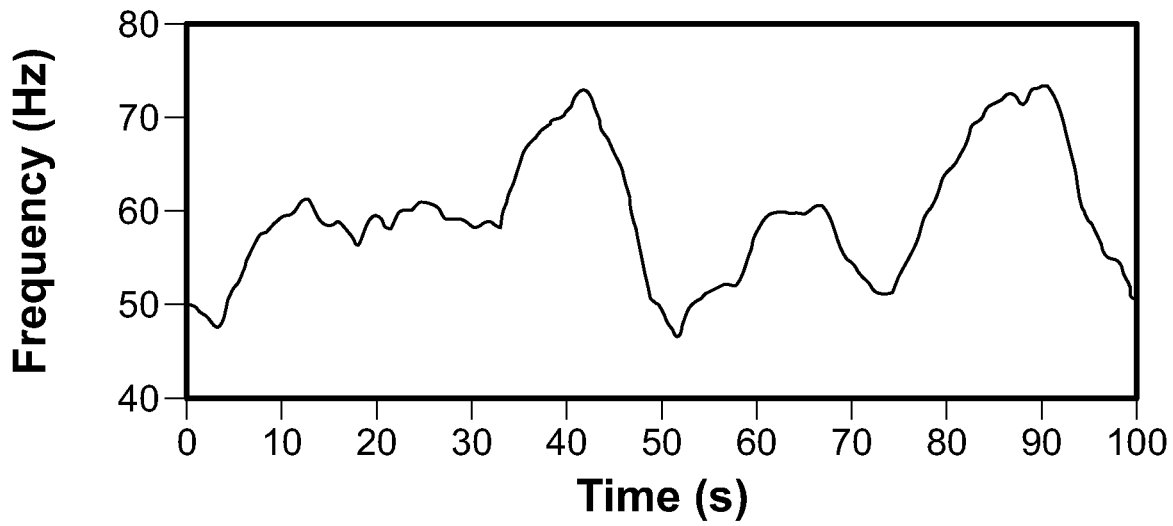

Although the current signal is approximately a monocomponent signal because the amplitudes of other components are extremely small, the performance of the phase-based IFE method is still not satisfactory, as shown in FIGS. 3A and 3B. FIG. 3A shows the IF estimated by the phase-based method. The waveform fluctuates largely and has meaningless negative frequencies, indicating that the phase-based method is sensitive to small interference. The IF depicted in FIG. 3A is further processed by a local average algorithm to remove the effect of interference, where, in the depicted example, each point is substituted by the mean value of the 400 points around it. The processed IF waveform is shown in FIG. 3B, where the trend of the IF variation is exposed, implying that the fundamental frequency component is embedded in FIG. 3A, but the waveform is still noisy. In some implementations, a local average algorithm using more local points for averaging can further reduce the noise level. However, the resulting IF may lose some local properties when the speed varies sharply and the computation time will increase accordingly. The IF estimated by the TFD-based method via direct maximum is shown in FIG. 3C. FIG. 3C shows that the IF waveform is smoother than that in FIG. 3B. This indicates that the TFD-based method is robust to noise.

The shaft rotating frequency fr (t) can be calculated according to (Eq. 9) (158). The shaft rotating frequency fr (t) can be used as the reference signal for the angular resampling of the vibration envelope signal depicted in the next section.

Vibration Signal Resampling (164)

The general idea of order tracking is to resample the equal-time-interval vibration signal at the times relative to the equal-phase-increment shaft rotation (168). This process can be called angular resampling. Angular resampling can be performed by first establishing a phase-time relationship according to the reference signal extracted. Then two interpolation operations with the aid of the phase-time relationship are performed. One interpolation is performed on the vector of the time points, $T=[t0, t1, t2, \ldots]$, of the samples of the extracted reference signal to obtain a new vector of the time points, $T=[t, t, t, \ldots]$, so that the samples correspond to a shaft rotating with a constant phase increment in the angle domain. The second interpolation is then performed on the oversampled envelope of the vibration signal based on the new time points to obtain an angularly resampled vibration envelope signal (168).

According to the shaft rotating frequency fr (t) (i.e., the reference signal) obtained from the current signal using the TFD-based method, the relationship of shaft phase position versus time is constructed by $$\theta(t_i) = 2\pi \Sigma_{t=0}^{t=i} f_r(t) \Delta t, t_i \in T \quad \text{(Eq. 10)}$$

where $\Delta t = 1/fsr$ is the sampling time interval with fsr as the sampling frequency of the reference signal, and the shaft phase position $\theta(t_i)$ represents the accumulated phase over the period that the shaft has rotated from the time point $t_0$ to $t_i$. The shaft phase-time relationship can also be formed as $$\theta(t'_i) = i \cdot \Delta\theta, t'_i \in T' \quad \text{(Eq. 11)}$$

$$\Delta\theta = \frac{2\pi}{f'_s} \quad \text{(Eq. 12)}$$

where $\Delta\theta$ is a constant phase increment, and where f is the resampling frequency for the vibration envelope signal. Here f is defined in the angle domain and, therefore, means the number of samples per revolution. To ensure that there is no loss of frequency contents in the resampled signal, the resampling frequency is determined by $$f'_s = \frac{f_s}{f_{rmin}} \quad \text{(Eq. 13)}$$

where fs is the sampling frequency of the vibration signal; $f_{rmin}$ is the minimum shaft rotating frequency during the entire period of the current/vibration signal used for the analysis, i.e., $$f_{rmin} = \min\{f_r(t)\}, t \in T \quad \text{(Eq. 14)}$$

The resampling time point vector T can be determined by using an interpolation method on the original sampling time point vector T based on the phase-time relationships expressed by (Eq. 10) and (Eq. 11). In some implementations, the cubic spline interpolation method can be employed to provide improved accuracy and less spectral leakage than other interpolation methods. In the method, a cubic piecewise polynomial is constructed for each time interval. The smoothness of the connection of the adjacent polynomials is assured by the continuity constraints that the first- and second-order derivatives of the adjacent polynomials are equal at their connection point, respectively. For example, the cubic piecewise polynomial for the phase-time relationship (Eq. 10) in the time interval $[t_i, t_i+1]$ may be determined as:

$$y = \Theta_i(t), t \in [t_i, t_{i+1}] \quad \text{(Eq. 15)}$$

According to (Eq. 11) and (Eq. 15), the following is obtained:

$$\Theta_i(t'_i) = \theta(t'_i), t'_i \in T' \text{ and } t_i \leq t'_i \leq t_{i+1} \quad \text{(Eq. 16)}$$

Then, the time point t for the equal-phase-increment resampling is determined by solving (Eq. 16). Finally, all the resampling time points T obtained by the cubic spline interpolation method can be used for resampling the vibration envelope signal.

The envelope of the bearing vibration signal can be determined (166), for example, by using the Hilbert transform expressed by (Eq. 3) to extract the envelope signal e(t) from the bearing vibration signal v(t) as follows:

$$e(t) = \sqrt{[v(t)]^2 + [\hat{v}(t)]^2} \qquad \text{(Eq. 17)}$$

where the amplitude of the analytic signal of v(t) is defined as the envelope signal. To avoid aliasing in the resampling process, the envelope signal e(t) should be first oversampled by q (q∈N and q>1) times the sampling frequency of the original vibration signal to generate a new vibration envelope signal e(τ) with the vector of the time points Γ=[τ₀, τ₁, τ₂, . . . ]. Then, the second interpolation operation is performed on the signal e(τ) to obtain the angle-domain vibration envelope signal e(θ) by using the cubic spline interpolation method as well. For example, the cubic piecewise polynomial for e(τ) in the time interval [τᵢ, τᵢ+1] may be represented by:

$$y = E_i(\tau), \tau \in [\tau_i, \tau_{i+1}] \qquad \text{(Eq. 18)}$$

Then, e(θ) in this time interval is obtained as $$e[\theta(t'_i)] = E_i(t'_i), t'_i \in T \text{ and } \tau_i \le t'_i \le \tau_{i+1} \qquad \text{(Eq. 19)}$$

where the signal e(θ) is sampled at equal phase increments of the shaft in the angle domain and, therefore, has no spectrum smearing problem anymore.

Bearing Fault Detection (170) and Diagnosis (172)

The resampled vibration envelope signal e(θ) is an order tracked signal. Here the "order" O(t) is referred to as the frequency normalized by the shaft rotating frequency fr(t) as:

$$O(t) = \frac{f(t)}{f_r(t)} \qquad \text{(Eq. 20)}$$

where f(t) is the time-varying frequencies contained in the original vibration envelope signal e(t). It can be concluded that if f(t) varies in proportion to fr (t), the corresponding order O(t) will be constant. This is why the order tracking method can eliminate the effect of speed fluctuation. In the spectrum of the resampled angle-domain vibration envelope signal e(θ), the peaks represent the orders of the speed-related frequencies. Therefore, the spectrum is called order-domain spectrum, and is denoted by P(O). If a constant frequency frc is appointed for the order 1 and stands for the fundamental rotating frequency, the other orders will also be converted into time-invariant frequencies, which will facilitate the identification of the characteristic frequencies. In this way, the order-domain spectrum P(O) is transformed inversely into the frequency-domain spectrum, which is denoted by P(f).

Bearing faults can occur in the inner raceway, outer raceway, rolling elements, and cage. The corresponding fault characteristic frequencies in the envelope spectrum of the vibration signal are functions of the bearing geometry and rotating speed and can be expressed as follows:

$$f_{BPFI} = \frac{nf_r}{2}\left(1 + \frac{d}{D}\cos\alpha\right) \qquad \text{(Eq. 21)}$$

$$f_{BPFO} = \frac{nf_r}{2}\left(1 - \frac{d}{D}\cos\alpha\right) \qquad \text{(Eq. 22)}$$

$$f_{BSF} = \frac{f_r D}{d}\left[1 - \left(\frac{d}{D}\cos\alpha\right)^2\right] \qquad \text{(Eq. 23)}$$

$$f_{FTFO} = \frac{f_r}{2}\left(1 - \frac{d}{D}\cos\alpha\right) \qquad \text{(Eq. 24)}$$

$$f_{FTFI} = \frac{f_r}{2}\left(1 + \frac{d}{D}\cos\alpha\right) \qquad \text{(Eq. 25)}$$

where fr is the shaft rotating frequency; n is the number of rolling elements; d is the diameter of the rolling element; D is the pitch diameter; α is the contact angle; fBPFI, fBPFO, and fBSF are the characteristic frequencies of a bearing inner race, outer race and rolling element fault, respectively; fFTFO and fFTFI are the characteristic frequencies of a bearing cage fault when the damaged cage touches the outer and inner rings, respectively. For a specific bearing, the geometry is fixed. Thus, each fault characteristic frequency fd(fd∈[fBPFI, fBPFO, fBSF, fFTFO, fFTFI]) only varies in proportion to the shaft rotating frequency. Therefore, the order of the characteristic frequency is constant and can be exposed (if it exists) in the order-domain spectrum under varying-speed conditions. The ratios between the fault characteristic frequencies and the shaft rotating frequency in (Eq. 21)-(Eq. 25) are the corresponding orders of the fault characteristic frequencies. Since a wind turbine is often connected to a power grid or load, the time-varying fundamental frequency fb(t) of the stator current signal can be converted to the constant grid/load frequency fp using a power electronic converter. Therefore, fp can be selected as a reference current frequency (169), in some examples. For example, a corresponding reference shaft rotating frequency frc can be calculated as frc=fP/p according to (Eq. 9). By substituting fr with frc in (Eq. 21)-(Eq. 25), the bearing fault characteristic frequencies are determined and used as the indicators for bearing fault diagnosis (detection and isolation). They are expected to be identified in the frequency-domain spectrum P(f) when the corresponding faults occur.

EXPERIMENTAL RESULTS

TABLE I

CHARACTERISTIC FREQUENCIES OF TEST BEARING WITH f_rc = 10 Hz

| | Inner race fault (f_BPFI) | Outer race fault (f_BPFO) | Cage fault relative to outer ring (f_FTFO) | Cage fault relative to inner ring (f_FTFI) |
|---|---|---|---|---|
| Characteristic frequency (Hz) | 49.306 | 30.694 | 3.837 | 6.164 |

The example bearing characteristic signature data shown in Table I represents characteristic frequencies of deep groove ball bearings used in experimental tests of an implementation of the methods disclosed herein. The reference current frequency is fP=60 Hz. Thus, the reference shaft rotating frequency is frc=fP/p=10 Hz. According to these parameters, the characteristic frequencies of the bearing inner-race, outer-race, and cage faults are calculated and listed in Table I. The value of q for oversampling the vibration envelope signal is 10.

The following sections include example experimental implementations of, the proposed current-aided vibration order tracking method to detect bearing inner-race, outer-race, and cage faults and healthy bearing, respectively. The bearing characteristic frequency expressions in the stator current signals are given in Table II, where k is a positive integer. For the purpose of comparison, the stator current signals are also resampled in the same way of the vibration envelope signals to identify the corresponding characteristic frequencies in the following cases.

TABLE II

BEARING CHARACTERISTIC FREQUENCY EXPRESSIONS IN THE STATOR CURRENT SIGNALS

| | Inner race fault ($f_{BPFI}$) | Outer race fault ($f_{BPFO}$) | Cage fault relative to outer ring ($f_{FTFO}$) | Cage fault relative to inner ring ($f_{FTFI}$) |
|---|---|---|---|---|
| Characteristic frequency expressions | fp ± frc ± kfBPFI | fp ± kfBPFO | fp ± kfFTFO | fp ± kfFTFI |

Bearing Inner-Race Fault Diagnosis

Figure 4A:
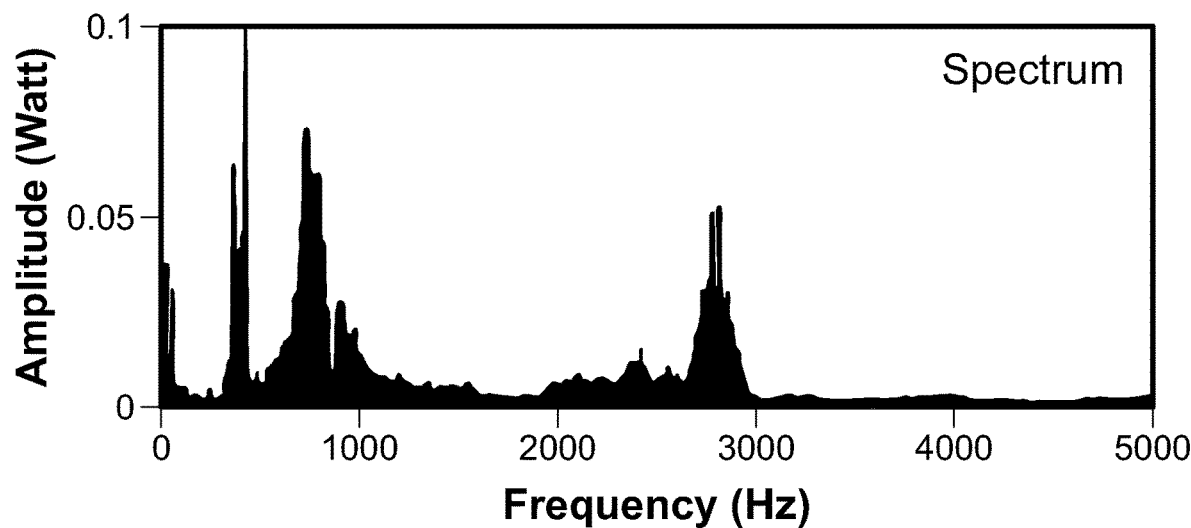
FIGS. 4A and 4B depict graphs of the power spectra of the (FIG. 4A) vibration and (FIG. 4B) current signals measured from the wind turbine with the bearing inner-race fault.
Figure 4B:
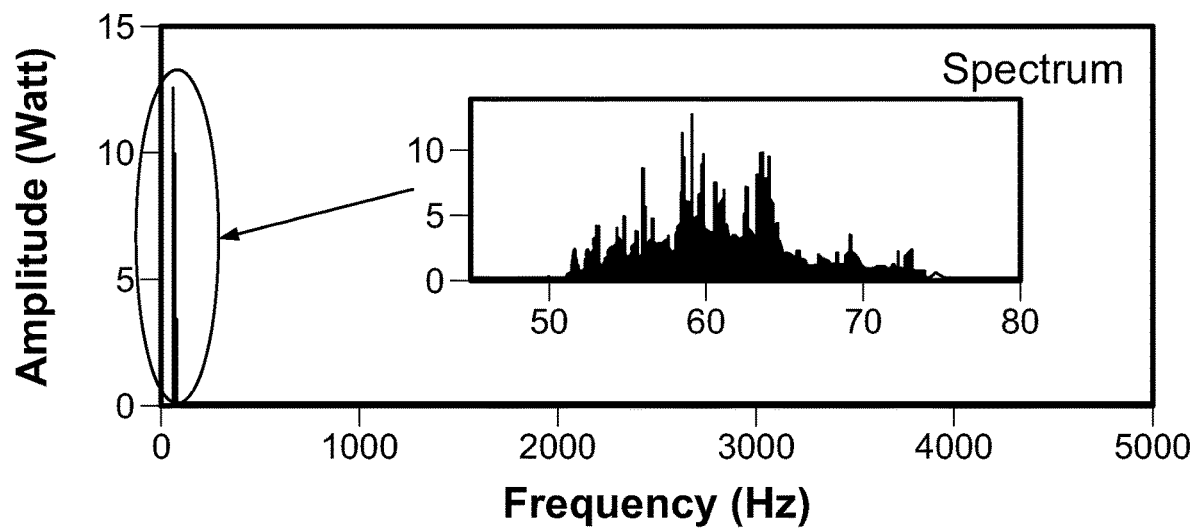
Figure 5:
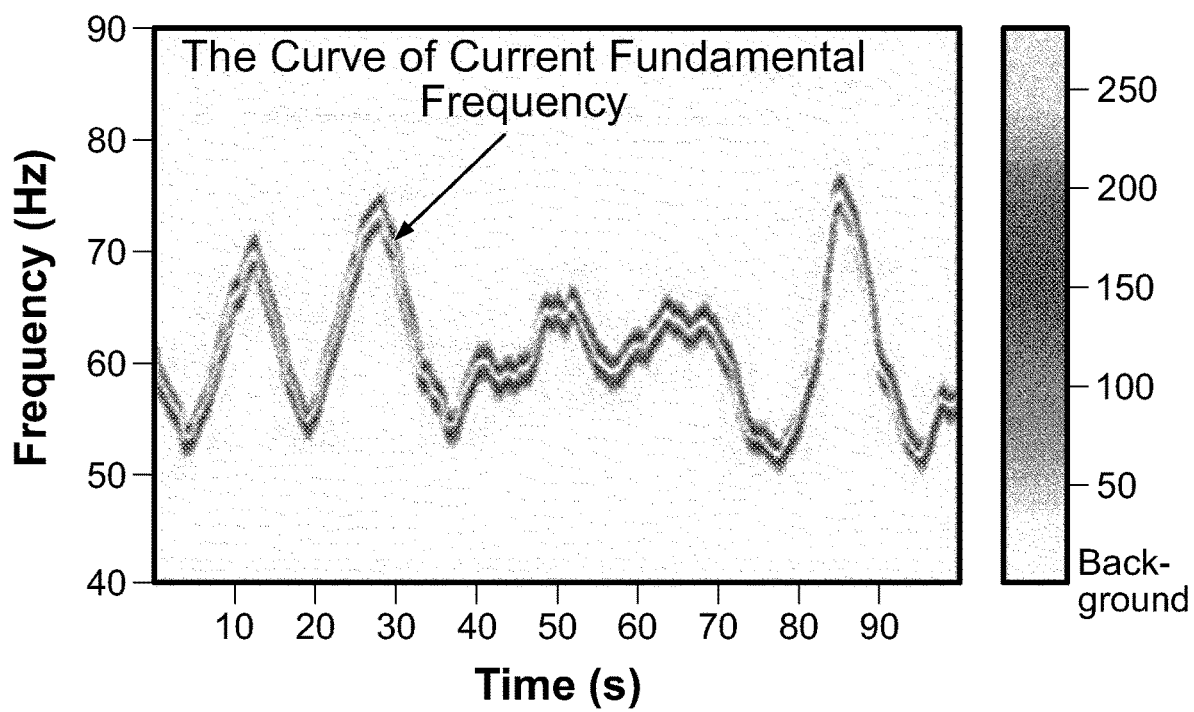
FIG. 5 depicts a graph of the partial TFD of the current signal measured from the wind turbine with the bearing inner-race fault containing the curve of the fundamental frequency.
Figure 6A:
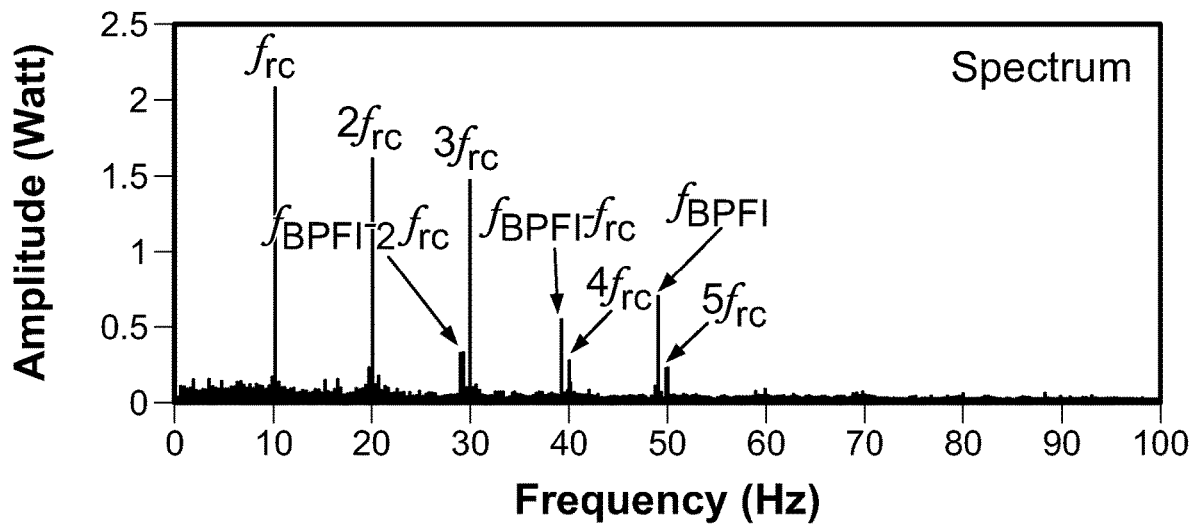
FIGS. 6A and 6B depict graphs of the power spectra of the resampled (FIG. 6A) vibration envelope signal and (FIG. 6B) current signal for the wind turbine with the bearing inner-race fault.

The current and vibration data measured from the wind tur-bine with the bearing inner-race fault are first analyzed by the proposed method. The power spectra of the measured vibration and current signals are shown in FIGS. 4A and 4B. As shown in FIG. 4A, the resonance band with equally spaced sidebands cannot be identified in the power spectrum of the vibration signal due to the fluctuation of the shaft speed. Since it is hard to determine the resonance band that contains the fault information, the envelope signal is extracted without bandpass filtering. In the power spectrum of the current signal in FIG. 4B, the dominant fundamental frequency component spreads in the range from 50 to 75 Hz caused by the speed fluctuation. The frequency variation in this range can be clearly presented in the time-frequency domain, as depicted in FIG. 5, where the curve of the fundamental frequency is easily obtained by the direct maximum method expressed by (Eq. 8). According to this curve, the instantaneous shaft rotating frequency can be calculated by (Eq. 9), and the shaft phase-time relationship can then be established using (Eq. 10). With this information, the vibration envelope signal is then resampled in the angle domain. By applying the fast Fourier transform on the resampled vibration envelope signal, the order-domain spectrum is obtained and further converted into the frequency domain using the selected reference shaft frequency frc=10 Hz. The resulting frequency-domain spectrum is plotted in FIG. 6A, from which the inner-race fault characteristic frequency fBPFI=49.19 Hz is identified. It is worthy to note that the fault characteristic frequency can be distinguished from the fifth harmonic of the reference shaft rotating frequency, although they are very close. In addition, there are two peaks near the third and fourth harmonics of the reference shaft rotating frequency, respectively. The two peaks are actually the sidebands of the fault characteristic frequency (i.e., fBPFI-frc and fBPFI-2frc) as the consequence of the modulation by the shaft rotating frequency. This phenomenon may be caused by the transmission path between the damage point and the measurement point or by the periodically nonuniform loading, which further validated the existence of the bearing inner-race fault.

Figure 6B:
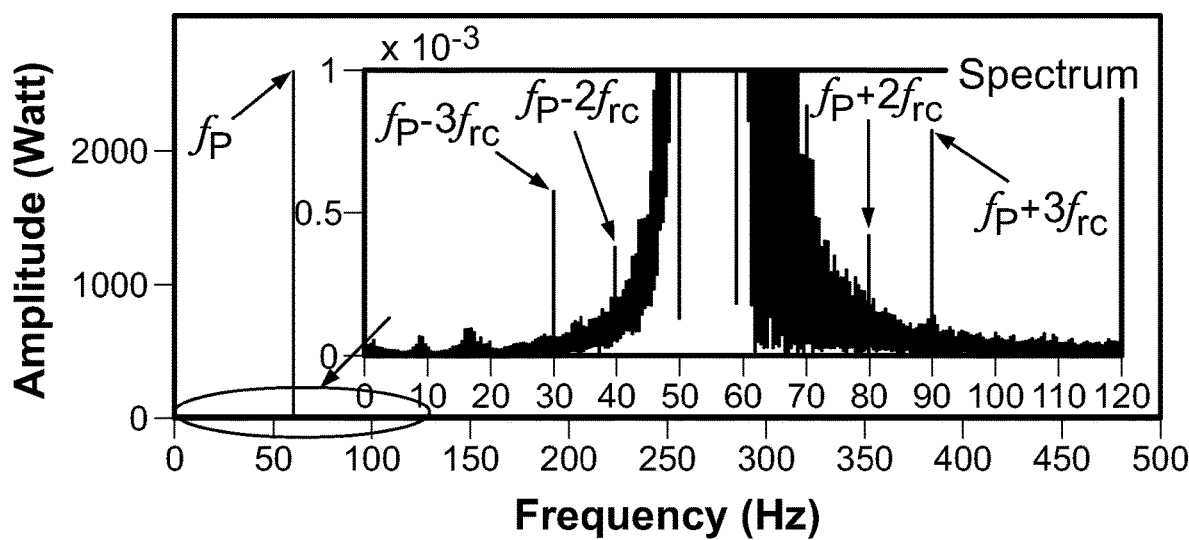

As a comparison, the original current signal is also resampled in the same way. The final frequency-domain spectrum of the resampled current signal is plotted in FIG. 6B, where the reference current frequency fP=60 Hz is clearly revealed. However, the amplitude of the reference frequency component is so large that no other components can be observed in the whole spectrum. By magnifying the area around fP, some side-bands spaced at twice and three times the rotating frequency are exposed in the spectrum. As listed in Table III, the characteristic frequencies of the bearing inner-race fault in the stator current signal are finner=fP±frc±kfBPFI. Nevertheless, none of these fault characteristic frequencies can be found in the current spectrum. In other words, it fails to detect the bearing inner-race fault using the current-based order tracking method.

Bearing Outer-Race Fault Diagnosis

Figure 7A:
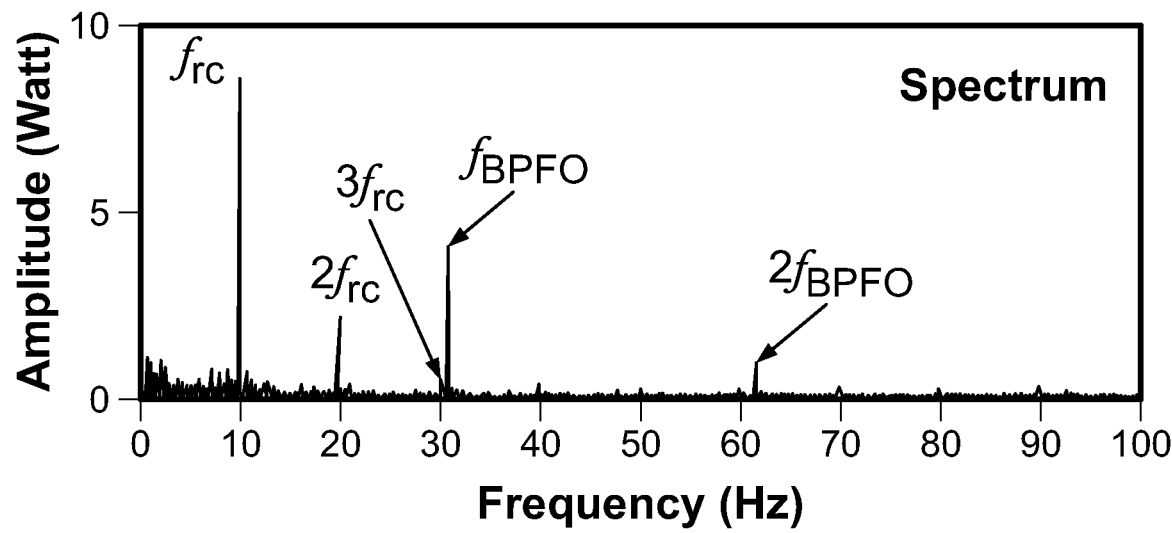
FIGS. 7A and 7B depict graphs of the power spectra of the resampled (FIG. 7A) vibration envelope signal and (FIG. 7B) current signal of the test wind turbine with the bearing outer-race fault.
Figure 7B:
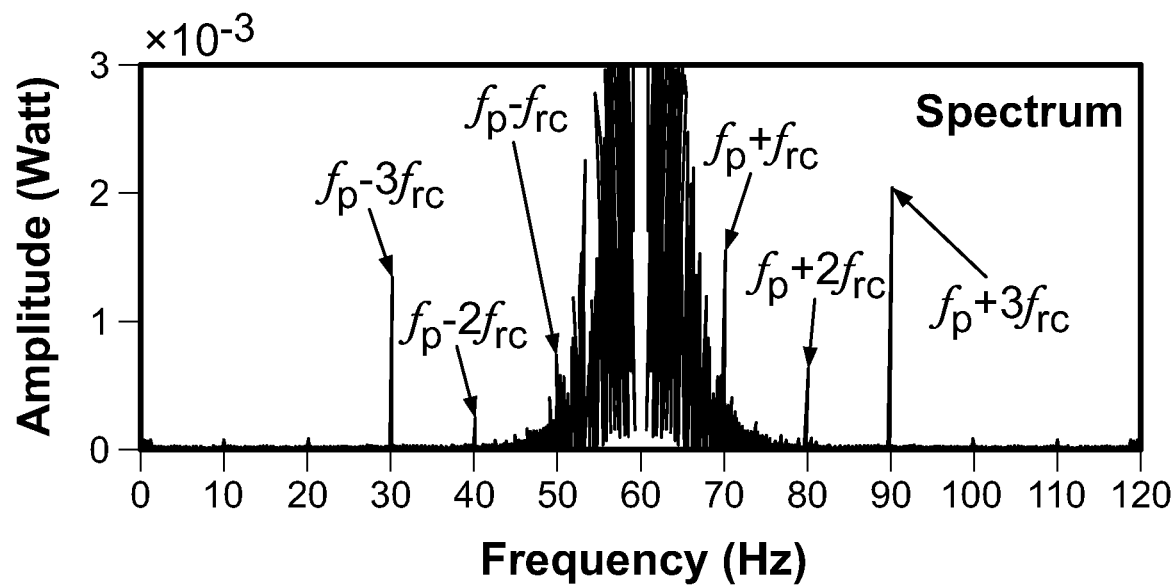

The current and vibration data measured from the test wind turbine with the bearing outer-race fault are then analyzed by the proposed method. These two signals are the same as those used in FIGS. 2 and 3. FIGS. 7A and B show the power spectra of the resampled vibration envelope signal and current signal. In FIG. 7A the outer-race fault characteristic frequency fBPFO=30.92 Hz and its second harmonic 2fBPFO are identified in the spectrum of the resampled vibration envelope signal. Furthermore, the fault characteristic frequency can be distinguished from the third harmonic of the shaft rotating frequency that is close to it. In the spectrum of the resampled current signal in FIG. 7B, some sidebands around the fundamental frequency fP spaced at multipliers of the rotating frequency frc are found in the magnified spectrum. However, the characteristic frequencies of the bearing outer-race fault in the current signal fouter=fP±kfBPFO cannot be identified. This case study demonstrates that implementations of the current-aided vibration order tracking process 150 are effective for diagnosis of the bearing outer-race fault in the wind turbine, but the order tracking for the current signal failed to detect the fault.

Bearing Cage Fault Diagnosis

Figure 8A:
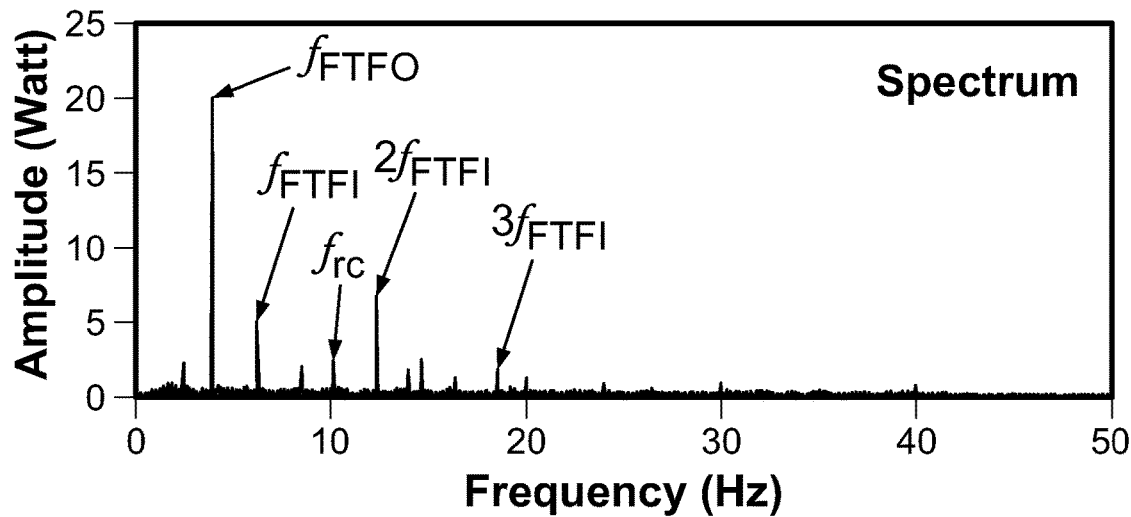
FIGS. 8A and 8B depict graphs of the power spectra of the resampled (FIG. 8A) vibration envelope signal and (FIG. 8B) current signal of the test wind turbine with the bearing cage fault.
Figure 8B:
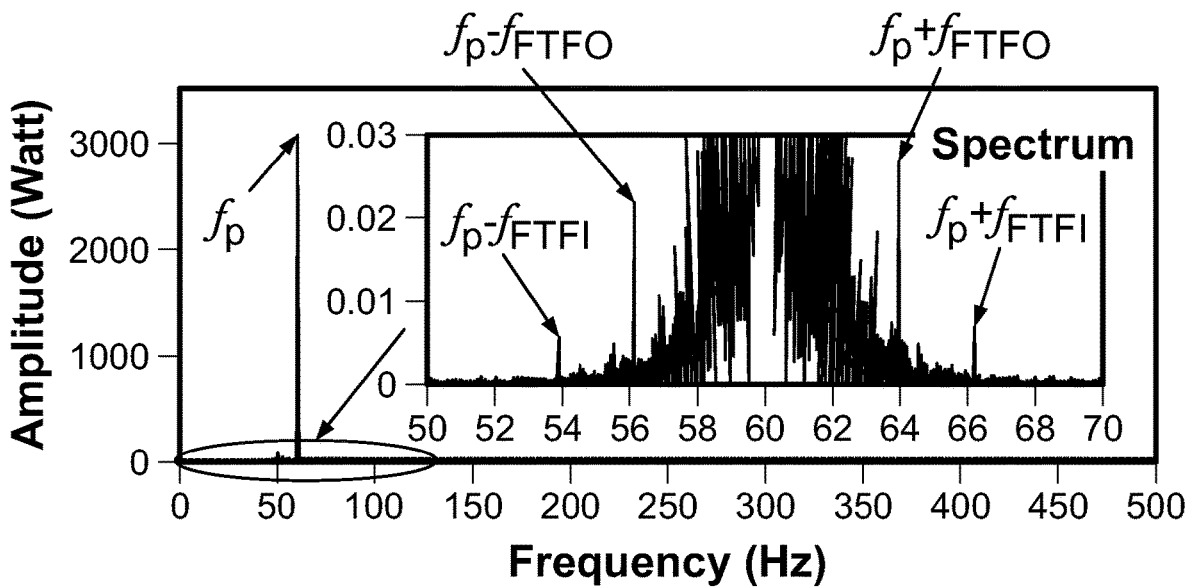

The current and vibration data measured from the test wind turbine with the bearing cage fault are also analyzed by the proposed method. FIG. 8A shows the power spectrum of the resampled vibration envelope signal, where one of the cage fault characteristic frequencies fFTFO=3.851 Hz is prominent, and the other cage fault characteristic frequency fFTFI=6.149 Hz and its two harmonics are also observed, indicating that a bear-ing cage fault occurs. In the magnified power spectrum of the resampled current signal shown in FIG. 8B, four cage fault characteristic frequencies in the current signal, fcageO=fP±kfFTFO (k=1) and fcageI=fP±kfFTFI (k=1), can be identified, proving that it is also effective to use the current-based order tracking method to detect the bearing cage fault. Nonetheless, the signal-to-noise ratio (SNR) of the current signal is so small that its spectrum has to be significantly enlarged in order to detect the fault information. To summarize, the bearing cage fault in the direct-drive wind turbine can be diagnosed by both the vibration-based and current-based order tracking methods, but the SNR of the vibration order tracking analysis is much larger than that of the current order tracking analysis.

Test Wind Turbine with Healthy Bearing

Figure 9A:
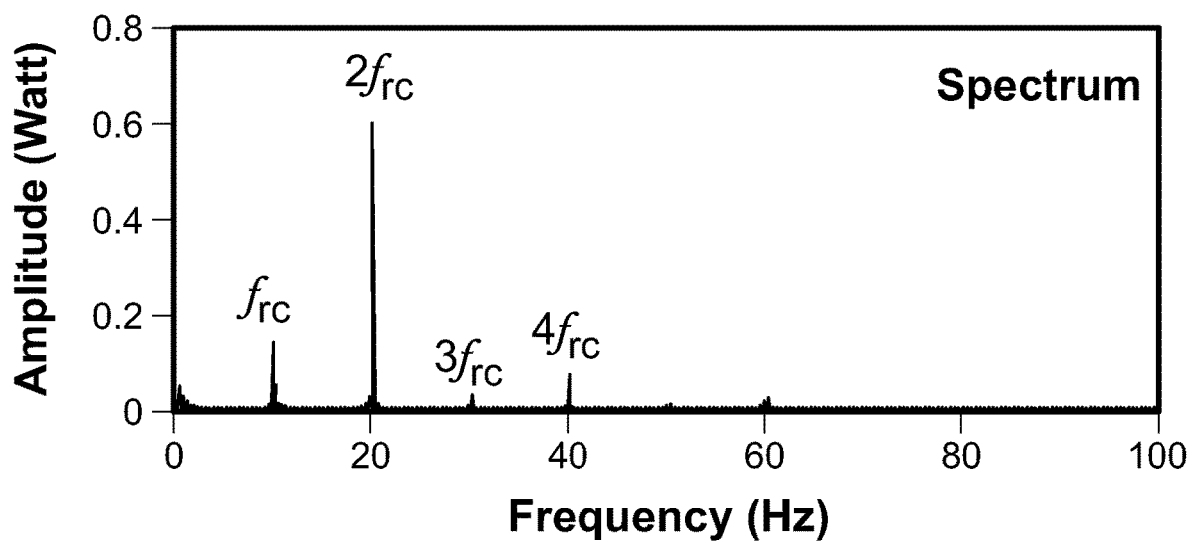
FIGS. 9A and 9B depict graphs of the power spectra of the resampled (FIG. 9A) vibration envelope signal and (FIG. 9B) current signal of the test wind turbine with the healthy bearing.
Figure 9B:
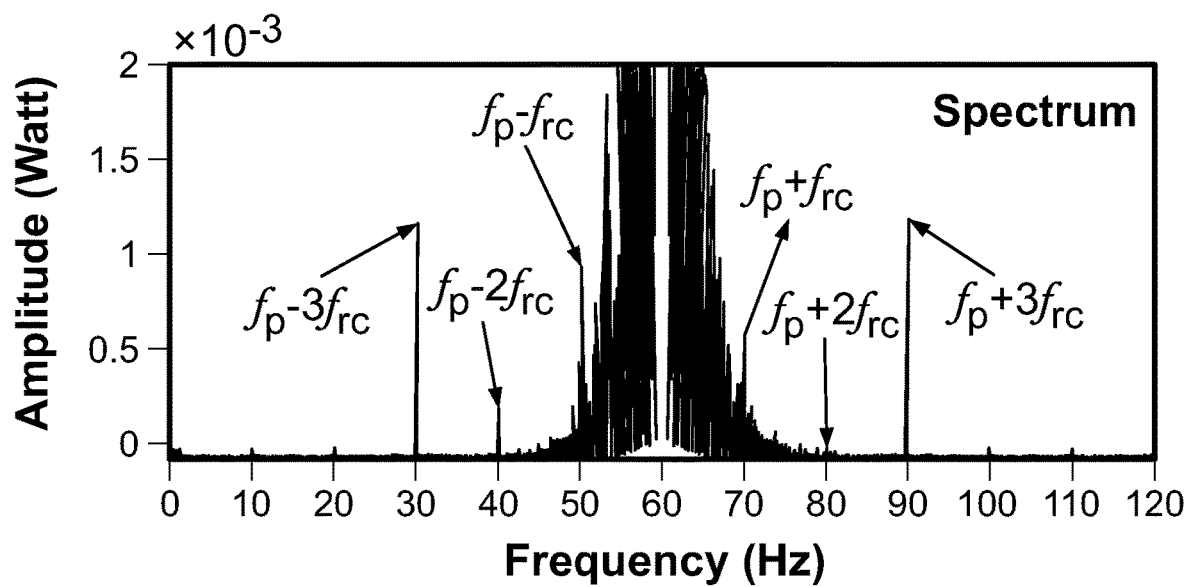

Finally, the power spectra of the resampled vibration envelope signal and current signal are presented in FIGS. 9A and 9B for the test wind turbine with the healthy bearing. As shown in FIG. 9A, except for the reference shaft rotating frequency and some of its harmonics, no bearing fault characteristic frequency is found in the power spectrum of the resampled vibration envelope signal. This indicates that the inspected bearing is healthy. Similarly, no fault characteristic frequency is found in the magnified spectrum of the resampled current signal in FIG. 9B except for the fundamental frequency and its sidebands spaced at multipliers of the shaft rotating frequency. However, the resampled-current signal alone cannot is insufficient to conclusively determine that the bearing is healthy, because even though a fault occurs in the inner or outer raceway, the corresponding fault characteristic frequencies may not appear in the power spectrum of the resampled current signal.

Table III summarizes the bearing fault diagnostic results by the vibration-based and current-based order tracking methods. In the power spectra of the resampled vibration envelope signals, the characteristic frequencies were identified when the test bearings had the corresponding localized faults, while no characteristic frequency was found when the test bearing was healthy. This indicates that the vibration-based order tracking method provides reliable diagnostic results. On the other hand, the current-based order tracking method only succeeded in identifying the characteristic frequencies when the bearing cage was broken, but cannot testify that the bearing is healthy when no characteristic frequency is identified. Thus, the vibration-based order tracking process described herein is more effective and reliable than the current-based order tracking method.

TABLE III

SUMMARY OF BEARING FAULT DIAGNOSTIC RESULTS BY VIBRATION-BASED AND CURRENT-BASED ORDER TRACKING METHODS

|  | Inner race fault | Outer race fault | Cage fault | No fault |
|---|---|---|---|---|
| Characteristic frequencies identified by vibration-based method | fBPFI, fBPFI-frc, fBPFI-2frc | fBPFO, 2fBPFO | fFTFO, fFTFI, 2fFTFI, 3fFTFI | None |
| Characteristic frequencies identified by current-based method | None | None | fp ± fFTFO, fp ± fFTFI | None |

In certain implementations, a computing system can be used to perform the operations described in association with any of the computer-implement methods, controllers, or systems described previously. The computing system can include a processor, a memory, a storage device, and an input/output device, for example. Each of the processor, memory, storage device, and/or input/output device can be interconnected using a system bus. The processor is capable of processing instructions for execution within the computing system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computing system. In one implementation, the memory is a computer-readable medium. In one implementation, the memory is a volatile memory unit. In another implementation, the memory is a non-volatile memory unit.

The storage device is capable of providing mass storage for the computing system. In one implementation, the storage device is a computer-readable medium. In various different implementations, the storage device may be a floppy disk device, a hard disk device, an optical disk device, or a tape device.

The input/output device provides input/output operations for the computing system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; cloud-based memory devices and disks, magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. It will be appreciated that any appropriate time interval may be used to make the determinations described above, and that the determinations may be made using any appropriate number of data points within the time interval. Accordingly, other implementations are within the scope of the following claims.

What is claimed is:

1. A wind turbine monitoring system comprising:
at least one processor; and a data store coupled to the at least one processor having instructions stored thereon which, when executed by the at least one processor, causes the at least one processor to perform operations comprising:
obtaining a first signal from a generator of a wind turbine and a second signal from a vibration sensor coupled to the wind turbine, the first signal representing an output current of the generator, and the second signal being a time-sampled signal representing vibrations of a component of the wind turbine;
determining a shaft rotation frequency signal from the first signal, the shaft rotation frequency signal representing a time-varying rotational speed of a shaft of the wind turbine;
resampling an envelope of the second signal based on the shaft rotation frequency signal to provide a third signal, the third signal being an angular sampled signal, wherein resampling the envelope of the second signal comprises:
determining, based on the shaft rotation frequency signal, a phase-time relationship between time steps of the shaft rotation frequency signal and phases of the shaft of the wind turbine, and
generating, based on the phase-time relationship, a resampling vector of time points representing constant phase increments of the shaft of the wind turbine in an angular domain; and detecting a fault in the wind turbine based on an analysis of the third signal.

2. The system of claim 1, wherein determining the shaft rotation frequency signal from the first signal comprises:
estimating, at each of multiple different time steps, a fundamental frequency of the first signal; and
determining, based on the fundamental frequency of the first signal at each time step, the shaft rotation frequency signal.

3. The system of claim 2, wherein estimating the fundamental frequency of the first signal at each time step comprises determining, at each time step, a maximum value of a time-frequency distribution of the first signal.

4. The system of claim 2, wherein determining the shaft rotation frequency signal comprises calculating the shaft rotation frequency signal from the fundamental frequency of the first signal based on a number of poles of the generator of the wind turbine.

5. The system of claim 1, wherein the operations further comprise determining the envelope of the second signal using a Hilbert transform of the second signal.

6. The system of claim 1, wherein the operations further comprise oversampling the envelope of the second signal using an oversampling frequency that is greater than a sampling frequency of the second signal.

7. The system of claim 1, wherein the envelope of the second signal is oversampled by an oversampling frequency that is greater than a sampling frequency of the second signal.

8. The system of claim 1, wherein resampling the envelope of the second signal comprises:
resampling the envelope of the second signal based on the resampling vector to provide the third signal representing vibrations of the component as being sampled at constant phase increments of the shaft of the wind turbine in the angular domain.

9. The system of claim 1, wherein detecting the fault in the wind turbine comprises:
generating an order-domain representation of the third signal; and
identifying a characteristic signature of a fault in the order-domain representation of the third signal.

10. The system of claim 9, wherein generating the order-domain representation of the third signal comprises performing a spectral analysis on the third signal.

11. The system of claim 10, wherein the operations further comprise identifying a type of the fault based on the characteristic signature.

12. The system of claim 11, wherein the type of the fault comprises a bearing fault, a gearbox fault, a generator fault, or a shaft fault.

13. The system of claim 1, wherein the operations further comprise providing, for display to a user, data indicating the fault in the wind turbine.

14. At least one non-transitory computer readable storage device storing instructions that, when executed by at least one processor, cause the at least one processor to perform operations comprising:
obtaining a first signal from a generator of a wind turbine and a second signal from a vibration sensor coupled to the wind turbine, the first signal representing an output current of the generator, and the second signal being a time-sampled signal representing vibrations of a component of the wind turbine;

determining a shaft rotation frequency signal from the first signal, the shaft rotation frequency signal representing a time-varying rotational speed of a shaft of the wind turbine;
resampling an envelope of the second signal based on the shaft rotation frequency signal to provide a third signal, the third signal being an angular sampled signal, wherein resampling the envelope of the second signal comprises:
determining, based on the shaft rotation frequency signal, a phase-time relationship between time steps of the shaft rotation frequency signal and phases of the shaft of the wind turbine, and
generating, based on the phase-time relationship, a resampling vector of time points representing constant phase increments of the shaft of the wind turbine in an angular domain; and
detecting a fault in the wind turbine based on an analysis of the third signal.

15. A wind turbine generator fault detection method executed by at least one processor, the method comprising:
obtaining a first signal from a generator of a wind turbine and a second signal from a vibration sensor coupled to the wind turbine, the first signal representing an output current of the generator, and the second signal being a time-sampled signal representing vibrations of a component of the wind turbine;
determining, by the at least one processor, a shaft rotation frequency signal from the first signal, the shaft rotation frequency signal representing a time-varying rotational speed of a shaft of the wind turbine;
resampling, by the at least one processor, an envelope of the second signal based on the shaft rotation frequency signal to provide a third signal, the third signal being an angular sampled signal, wherein resampling the envelope of the second signal comprises:
determining, based on the shaft rotation frequency signal, a phase-time relationship between time steps of the shaft rotation frequency signal and phases of the shaft of the wind turbine, and
generating, based on the phase-time relationship, a resampling vector of time points representing constant phase increments of the shaft of the wind turbine in an angular domain; and
detecting, by the at least one processor, a fault in the wind turbine based on an analysis of the third signal.

16. The method of claim 15, wherein determining the shaft rotation frequency signal from the first signal comprises:
estimating, at each of multiple different time steps, a fundamental frequency of the first signal; and
determining, based on the fundamental frequency of the first signal at each time step, the shaft rotation frequency signal.

17. The method of claim 16, wherein estimating the fundamental frequency of the first signal at each time step comprises determining, at each time step, a maximum value of a time-frequency distribution of the first signal.

18. The method of claim 15, wherein detecting the fault in the wind turbine comprises:
generating an order-domain representation of the third signal; and
identifying a characteristic signature of a fault in the order-domain representation of the third signal.

19. The method of claim 18, wherein generating the order-domain representation of the third signal comprises performing a spectral analysis on the third signal.

20. The method of claim 19, further comprising identifying a type of the fault based on the characteristic signature, and
wherein the type of the fault comprises a bearing fault, a gearbox fault, a generator fault, or a shaft fault.

* * * * *